US009282327B2

(12) United States Patent
Pandit et al.

(10) Patent No.: US 9,282,327 B2
(45) Date of Patent: *Mar. 8, 2016

(54) METHOD AND APPARATUS FOR VIDEO ERROR CONCEALMENT IN MULTI-VIEW CODED VIDEO USING HIGH LEVEL SYNTAX

(75) Inventors: Purvin Bibhas Pandit, Franklin Park, NJ (US); Peng Yin, West Windsor, NJ (US); Yeping Su, Camas, WA (US)

(73) Assignee: Thomson Licensing LLC, Boulogne-Billancourt (FR)

( * ) Notice: Subject to any disclaimer, the term of this patent is extended or adjusted under 35 U.S.C. 154(b) by 1959 days.

This patent is subject to a terminal disclaimer.

(21) Appl. No.: 12/448,462

(22) PCT Filed: Jan. 4, 2008

(86) PCT No.: PCT/US2008/000115
§ 371 (c)(1),
(2), (4) Date: Jun. 19, 2009

(87) PCT Pub. No.: WO2008/085887
PCT Pub. Date: Jul. 17, 2008

(65) Prior Publication Data
US 2010/0027681 A1 Feb. 4, 2010

Related U.S. Application Data

(60) Provisional application No. 60/883,454, filed on Jan. 4, 2007.

(51) Int. Cl.
H04N 7/12 (2006.01)
H04N 19/00 (2014.01)
(Continued)

(52) U.S. Cl.
CPC ............. *H04N 19/00* (2013.01); *H04N 19/597* (2014.11); *H04N 19/70* (2014.11); *H04N 19/89* (2014.11)

(58) Field of Classification Search
CPC ..... H04N 19/597; H04N 19/00; H04N 19/89; H04N 19/70

USPC ........................... 375/240.12, 240.13, 240.25
See application file for complete search history.

(56) References Cited

U.S. PATENT DOCUMENTS 7,924,928 B2    4/2011   Mori et al.
8,111,758 B2    2/2012   Yun et al.
(Continued)

FOREIGN PATENT DOCUMENTS

JP    2007322302    8/1995
JP    2003319419    11/2003
(Continued)

OTHER PUBLICATIONS

Pandit et al.:"High Level Syntax Changes for MVC", Thomson Inc., Joint Video Team (JVT) of ISO/IEC MPEG & ITU-T VCEG, JVT-V054, pp. 1-10, Jan. 13, 2006, XP0030006862.
(Continued)

*Primary Examiner* — Y Lee
*Assistant Examiner* — Richard Carter
(74) *Attorney, Agent, or Firm* — Vincent E. Duffy; Guy H. Eriksen; Ivonete Markman

(57) ABSTRACT

There are provided a method and apparatus for video error concealment in multi-view coded video using high level syntax. The apparatus includes a decoder for decoding pictures for at least one view corresponding to multi-view video content from a bitstream. The pictures are representative of at least a portion of a video sequence. At least some of the pictures correspond to different time instances in the video sequence. The decoder determines whether any of the pictures corresponding to a particular one of the different time instances are lost using an existing syntax element. The existing syntax element is for indicating a number of coded views in the bitstream, including the at least one view.

30 Claims, 4 Drawing Sheets

(51) Int. Cl.
*H04N 19/597* (2014.01)
*H04N 19/70* (2014.01)
*H04N 19/89* (2014.01)

(56) References Cited

U.S. PATENT DOCUMENTS

| | | | | |
|---|---|---|---|---|
| 2008/0095234 A1* | 4/2008 | Wang et al. | ............... | 375/240.13 |
| 2009/0103619 A1 | 4/2009 | Sohn et al. | | |
| 2010/0316135 A1* | 12/2010 | Jeon et al. | ............... | 375/240.25 |
| 2010/0322311 A1* | 12/2010 | Vetro et al. | ............... | 375/240.12 |

FOREIGN PATENT DOCUMENTS

| | | |
|---|---|---|
| JP | 2005510187 | 4/2005 |
| JP | 2006295568 | 10/2006 |
| JP | 2008503973 | 2/2008 |
| WO | WO2008088497 | 7/2008 |

OTHER PUBLICATIONS

Pang et al.:"An Approach to Error Concealment for Entire Right Frame Loss in Stereoscopic Video Transmission", IEEE, 2006, pp. 1665-1670, XP0031013096.
Ying:"Frame Loss Error Concealment for SVC", Thomson, Joint Video Team (JVT) of ISO/IEC MPEG & ITU-T VCEG, JVT-Q046, pp. 1-17, Oct. 14, 2005, XP002422831.
Pandit et al.:"MVC high-Level Syntax for random Access", Thomson, International Organisation for Standardisation Organisation Internationale De Normalisation ISO/IEC JTC1/SC29/WG11 Coding of Moving Pictures Audio, Jul. 2006, pp. 1-11, XP0030042384.
Kim et al.:"Comments on High-Level Syntax for MVC Contribution to the 769$^{th}$ MPEG Meeting", University of Southern California, Thomson, ISO/IEC JTC1/SC29/WG1, Apr. 2006, XP0030041988.
Vetro et al.:"Joint Draft 1.0 on Multiview Video Coding", Joint Video Team (JTV) of ISO/IEC MPEG & ITU-T VCEG, JVT-U209, pp. 1-20, Oct. 20, 2006.
Search Report dated Feb. 3, 2009.

* cited by examiner

METHOD AND APPARATUS FOR VIDEO ERROR CONCEALMENT IN MULTI-VIEW CODED VIDEO USING HIGH LEVEL SYNTAX

CROSS-REFERENCE TO RELATED APPLICATIONS

This application claims the benefit, under 35 U.S.C. §365 of International Application PCT/US2008/000115, filed Jan. 4, 2008 which was published in accordance with PCT Article 21(2) on Jul. 17, 2008 in English and which claims the benefit of U.S. provisional patent application No. 60/883,454 filed Jan. 4, 2007.

TECHNICAL FIELD

The present principles relate generally to video encoding and decoding and, more particularly, to a method and apparatus for video error concealment in multi-view coded video using high level syntax.

BACKGROUND

When a picture is lost in a corrupted bitstream, several picture-based error concealment methods can be used to conceal the lost picture. In order to perform concealment, the loss of a picture and the location of the picture have to be determined.

There have been several methods to detect the loss of a picture in the single view case. In the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"), the concept of frame_num serves the purpose of detecting the loss of reference pictures. Additionally, Supplemental Enhancement Information (SEI) messages such as the recovery point SEI message, sub-sequence SEI message, recovery point SEI message, reference picture marking repetition SEI message, as well as the picture order count (POC) design, and the multiple reference picture buffering may be used for the purpose of picture loss detection.

However, such methods have not been extended for the multi-view case.

SUMMARY

These and other drawbacks and disadvantages of the prior art are addressed by the present principles, which are directed to a method and apparatus for video error concealment in multi-view coded video using high level syntax.

According to an aspect of the present principles, there is provided an apparatus. The apparatus includes a decoder for decoding pictures for at least one view corresponding to multi-view video content from a bitstream. The pictures are representative of at least a portion of a video sequence. At least some of the pictures correspond to different time instances in the video sequence. The decoder determines whether any of the pictures corresponding to a particular one of the different time instances are lost using an existing syntax element. The existing syntax element is for indicating a number of coded views in the bitstream, including the at least one view.

According to another aspect of the present principles, there is provided a method. The method includes decoding pictures for at least one view corresponding to multi-view video content from a bitstream. The pictures are representative of at least a portion of a video sequence. At least some of the pictures correspond to different time instances in the video sequence. The decoding step includes determining whether any of the pictures corresponding to a particular one of the different time instances are lost using an existing syntax element. The existing syntax element is for indicating a number of coded views in the bitstream, including the at least one view.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
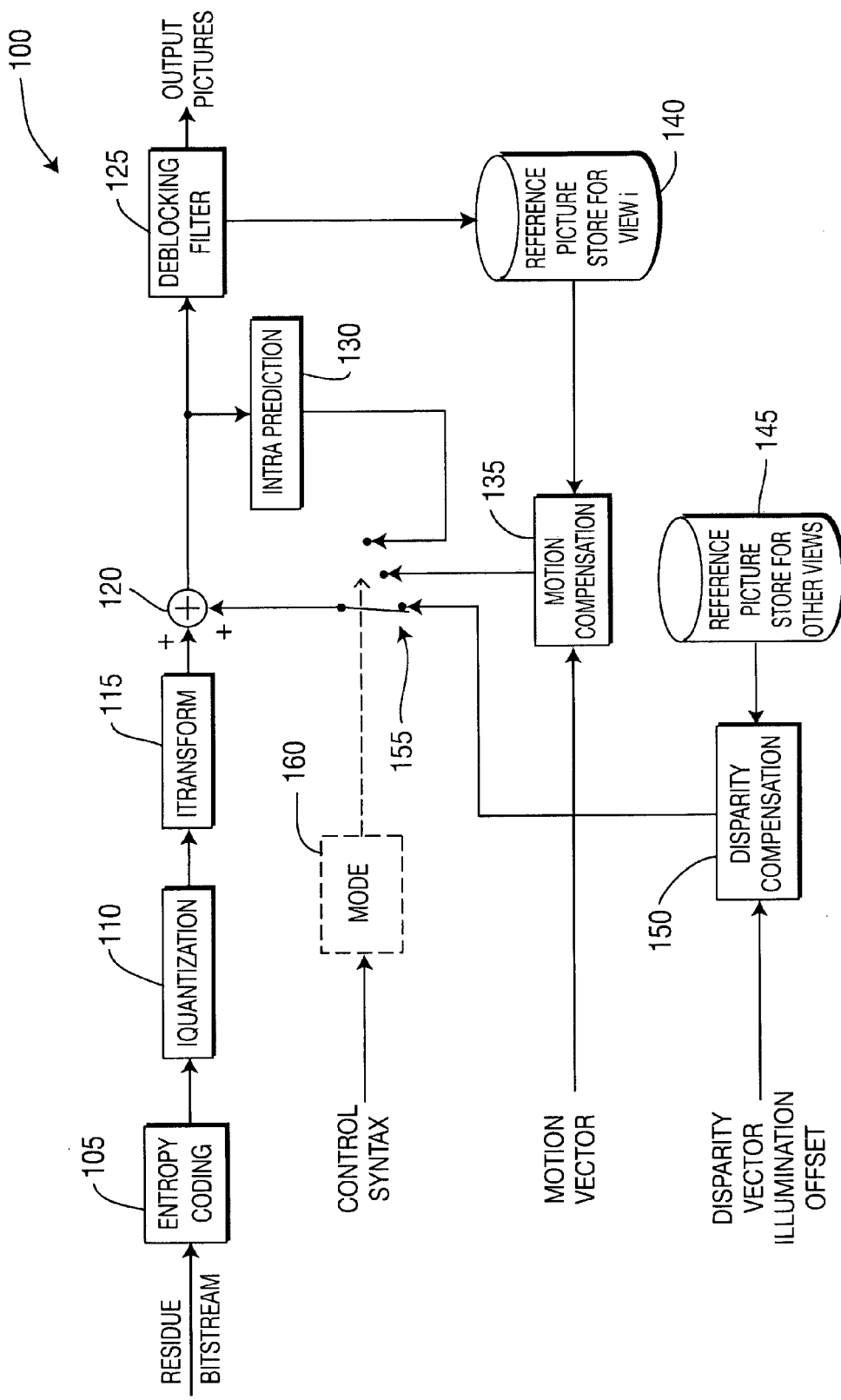
FIG. 1 is a block diagram for an exemplary Multi-view Video Coding (MVC) decoder to which the present principles may be applied, in accordance with an embodiment of the present principles.

The present principles are directed to a method and apparatus for video error concealment in multi-view coded video using high level syntax.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

As used herein, "high level syntax" refers to syntax present in the bitstream that resides hierarchically above the macroblock layer. For example, high level syntax, as used herein, may refer to, but is not limited to, syntax at the slice header level, the sequence parameter set (SPS) level, the picture parameter set (PPS) level, the view parameter set (VPS) level, the network abstraction layer (NAL) unit header level, and in a supplemental enhancement information (SEI) message.

For the sake of illustration and brevity, the following embodiments are described herein with respect to the use of the sequence parameter set. However, it is to be appreciated that the present principles are not limited to solely the use of the sequence parameter set with respect to the improved signaling disclosed herein and, thus, such improved signaling may be implemented with respect to at least the above-described types of high level syntaxes including, but not limited to, syntaxes at the slice header level, the sequence parameter set (SPS) level, the picture parameter set (PPS) level, the view parameter set (VPS) level, the network abstraction layer (NAL) unit header level, and in a supplemental enhancement information (SEI) message, while maintaining the spirit of the present principles.

It is to be further appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Moreover, it is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

Turning to FIG. 1, an exemplary Multi-view Video Coding (MVC) decoder is indicated generally by the reference numeral 100. The decoder 100 includes an entropy decoder 105 having an output connected in signal communication with an input of an inverse quantizer 110. An output of the inverse quantizer is connected in signal communication with an input of an inverse transformer 115. An output of the inverse transformer 115 is connected in signal communication with a first non-inverting input of a combiner 120. An output of the combiner 120 is connected in signal communication with an input of a deblocking filter 125 and an input of an intra predictor 130. An output of the deblocking filter 125 is connected in signal communication with an input of a reference picture store 140 (for view i). An output of the reference picture store 140 is connected in signal communication with a first input of a motion compensator 135.

An output of a reference picture store 145 (for other views) is connected in signal communication with a first input of a disparity/illumination compensator 150.

An input of the entropy coder 105 is available as an input to the decoder 100, for receiving a residue bitstream. Moreover, an input of a mode module 160 is also available as an input to the decoder 100, for receiving control syntax to control which input is selected by the switch 155. Further, a second input of the motion compensator 135 is available as an input of the decoder 100, for receiving motion vectors. Also, a second input of the disparity/illumination compensator 150 is available as an input to the decoder 100, for receiving disparity vectors and illumination compensation syntax.

An output of a switch 155 is connected in signal communication with a second non-inverting input of the combiner 120. A first input of the switch 155 is connected in signal communication with an output of the disparity/illumination compensator 150. A second input of the switch 155 is connected in signal communication with an output of the motion compensator 135. A third input of the switch 155 is connected in signal communication with an output of the intra predictor 130. An output of the mode module 160 is connected in signal communication with the switch 155 for controlling which input is selected by the switch 155. An output of the deblocking filter 125 is available as an output of the decoder.

In accordance with the present principles, methods and apparatus are provided for video error concealment in multi-view coded video using high level syntax. The present principles, at the least, address the problem of detection of picture loss in the case of multi-view coded video. Methods and apparatus are provided herein to identify/detect which pictures of a view are missing, lost, or dropped during transmission of a multi-view coded video sequence.

In an error-prone transmission environment, such as the Internet, wireless networks, and so forth, a transmitted video bitstream may suffer corruptions caused by, for example, channel impairment. A common situation encountered in some practical systems is that certain compressed video pictures are dropped from a bitstream. This is especially true for low bit-rate applications where a picture is small enough to be coded into a transmit unit, such as a real-time transport protocol (RTP) packet. At the receiver end, a robust video decoder should be able to detect such losses in order to conceal them.

In multi-view video coding (MVC), there are several views present in the coded video sequence. In the case of the current MVC extension of the MPEG-4 AVC Standard, each picture has associated with it a view identifier to identify which view to which it belongs. TABLE 1 shows the Network Abstraction Layer (NAL) unit header for the scalable video coding (SVC) multi-view video coding (MVC) extension syntax. Additionally, there are several high level syntaxes (in addition to the MPEG-4 AVC Standard syntaxes) that are present to assist in the decoding of the pictures from different views. These syntaxes are present in the Sequence Parameter Set (SPS) extension. TABLE 2 shows the sequence parameter set (SPS) in the multi-view video coding (MVC) extension of the MPEG-4 AVC Standard.

TABLE 1

| nal_unit_header_svc_mvc_extension( ) { | C | Descriptor |
|---|---|---|
| svc_mvc_flag | All | u(1) |
| if (!svc_mvc_flag) { | | |
| priority_id | All | u(6) |
| discardable_flag | All | u(1) |
| temporal_level | All | u(3) |
| dependency_id | All | u(3) |
| quality_level | All | u(2) |
| layer_base_flag | All | u(1) |
| use_base_prediction_flag | All | u(1) |
| fragmented_flag | All | u(1) |
| last_fragment_flag | All | u(1) |
| fragment_order | All | u(2) |
| reserved_zero_two_bits | All | u(2) |
| } else { | | |
| temporal_level | All | u(3) |
| view_level | All | u(3) |
| anchor_pic_flag | All | u(1) |
| view_id | All | u(10) |
| idr_flag | All | u(1) |
| reserved_zero_five_bits | All | u(5) |
| } | | |
| nalUnitHeaderBytes += 3 | | |
| } | | |

Thus, the current proposal for multi-view video coding based on the MPEG-4 AVC Standard (hereinafter "current MVC proposal for MPEG-4 AVC) includes high level syntax in the sequence parameter set (SPS) to indicate the number of coded views in the sequence. Additionally, the current MVC proposal for MPEG-4 AVC includes the inter-view references information for a view. The current MVC proposal for MPEG-4 AVC further distinguishes the dependencies of the anchor and non-anchor picture by separately sending the reference view identifiers. This is shown in TABLE 2, which includes information of which views are used as a reference for a certain view. We have recognized and propose that this information (the number of coded views) can be used in order to detect picture loss in the case of multi-view coded video.

Figure 2:
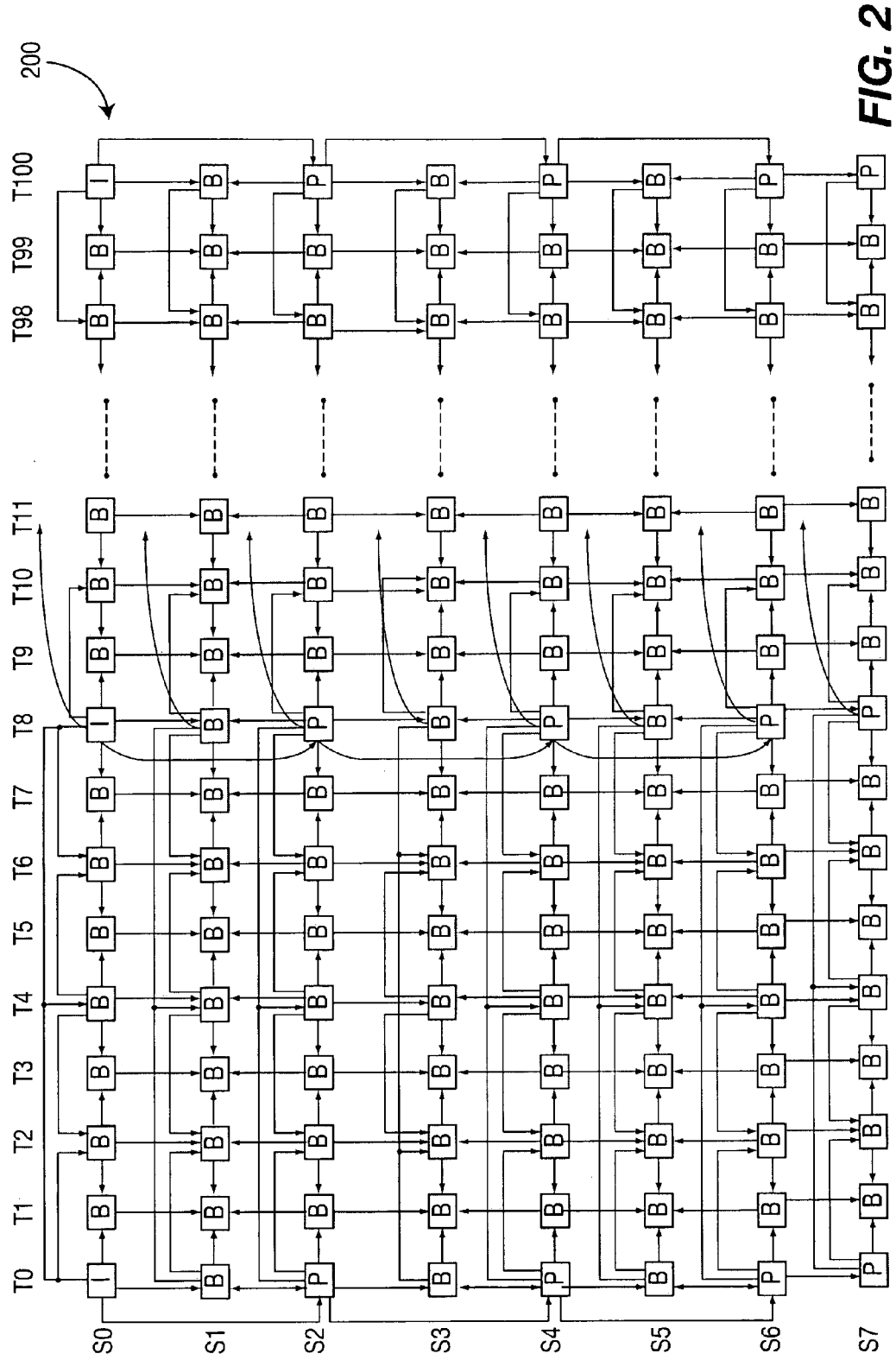
FIG. 2 is a diagram for a time-first coding structure for a multi-view video coding system with 8 views to which the present principles may be applied, in accordance with an embodiment of the present principles.

In the current multi-view video coding (MVC) extension of the MPEG-4 AVC Standard, it is mandated that pictures that belong to a certain time instant are coded first for all the views. Turning to FIG. 2, a time-first coding structure for a multi-view video coding system with 8 views is indicated generally by the reference numeral 200. In the example of FIG. 2, all pictures at the same time instance from different views are coded contiguously. Thus, all pictures (S0-S7) at time instant T0 are coded first, followed by pictures (S0-S7) at time T8, and so on. This is called time-first coding. Timely concealment of the lost picture is critical for the objective quality of other views.

Knowing this (time-first coding) and also the number of coded views in the sequence from the sequence parameter set (SPS) we can detect the loss of a picture. Additionally, in the illustrated embodiment, we presume that all the views have the same frame rate. However, it is to be appreciated that the present principles are not solely limited to applications involving video having the same frame rate and, thus, may also be readily applied to application involving video with different frame rates, while maintaining the spirit of the present principles. The frame rate information is present in the Video Usability Information (VUI) parameters present in the sequence parameter set. Since these parameters are optional they may or may not be present. In the case they are present, a separate sequence parameter set needs to be signaled for the view with a different frame rate. Once the decoder knows of the view that has a different frame rate, it may invoke an error detection method or simply disregard the outcome of the error detection method. Additionally, the decoder may choose to conceal the picture, but not use the picture for display purposes.

TABLE 2

| seq_parameter_set_mvc_extension( ) { | C | Descriptor |
|---|---|---|
| num_views_minus_1 | | ue(v) |
| for(i = 0; i <= num_views_minus_1; i++) { | | |
| num_anchor_refs_l0[i] | | ue(v) |
| for( j = 0; j < num_anchor_refs_l0[i]; j++ ) | | |
| anchor_ref_l0[i][j] | | ue(v) |
| num_anchor_refs_l1[i] | | ue(v) |
| for( j = 0; j < num_anchor_refs_l1[i]; j++ ) | | |
| anchor_ref_l1[i][j] | | ue(v) |
| } | | |
| for(i = 0; i <= num_views_minus_1; i++) { | | |
| num_non_anchor_refs_l0[i] | | ue(v) |
| for( j = 0; j < num_non_anchor_refs_l0[i]; j++ ) | | |
| non_anchor_ref_l0[i][j] | | ue(v) |
| num_non_anchor_refs_l1[i] | | ue(v) |
| for( j = 0; j < num_non_anchor_refs_l1[i]; j++ ) | | |
| non_anchor_ref_l1[i][j] | | ue(v) |
| } | | |
| } | | |

An embodiment of this detection algorithm is as follows. From the sequence parameter set we know the number of views that are coded (num_views_minus_1). We also know that all pictures at a certain time are coded first (time-first coding). Thus, for each time instance, we can first buffer all the pictures from each view (e.g., time T0). We keep a count of the number of pictures that arrive for that time instance (N) and the view identifier (view_id) of the pictures. Since we know the number of coded views from the sequence parameter set syntax, we compare these values to determine if there was any loss. If N is less than the value indicated in the SPS then we know that there was a loss. Additionally, since we keep track of the view_id that have arrived we can determine which view_ids are missing.

Also, if we assume that the MPEG-4 AVC Standard compatible view is the first view that is coded, then we know that in between two MPEG-4 AVC Standard compatible NAL units we are expecting num_views_minus_1 views. This information can also be used to detect the loss of pictures. Similar to the above embodiment, we can then determine the missing view_id(s).

In another embodiment, we only need to perform the buffering once at the beginning of the bitstream or after a change of coding order. Once we have determined the coding order by looking at the view_id order during the first buffering period, for the subsequent time instance we only need to check if the picture that arrives has the expected view_id. If it is determined that it does not have the expect view_id then we know that a picture belonging to the expected view_id was lost and thus needs to be concealed before decoding of other pictures.

Figure 3:
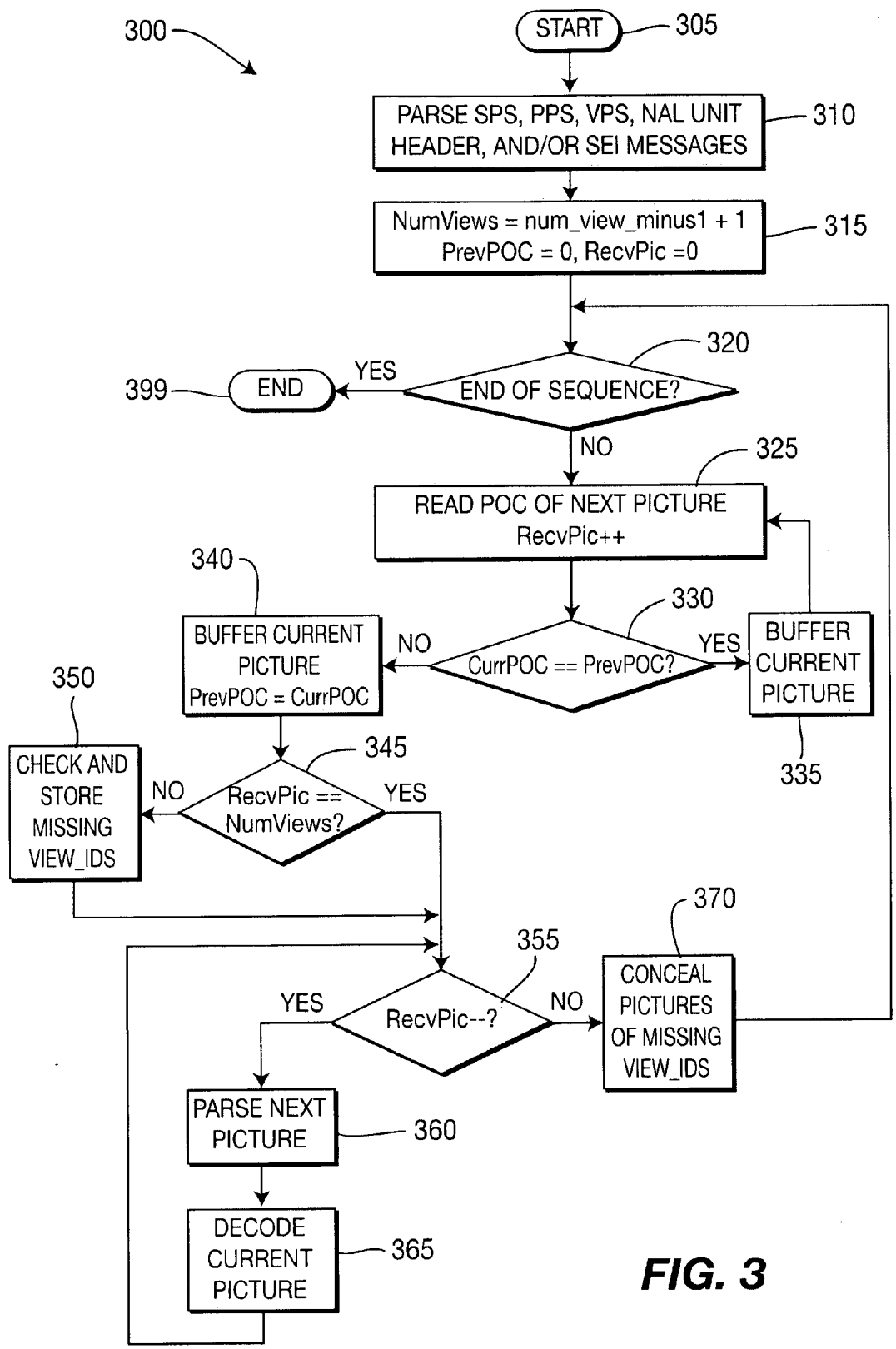
FIG. 3 is a flow diagram for an exemplary method for decoding video data corresponding to a video sequence using error concealment for lost pictures, in accordance with an embodiment of the present principles.

Turning to FIG. 3, an exemplary method for decoding video data corresponding to a video sequence using error concealment for lost pictures is indicated generally by the reference numeral 300.

The method 300 includes a start block 305 that passes control to a function block 310. The function block 310 parses the sequence parameter set (SPS), the picture parameter set (PPS), the view parameter set (VPS), the network abstraction layer (NAL) unit header, and/or any supplemental enhancement information (SEI) messages, and passes control to a function block 315. The function block 315 sets a variable NumViews equal to num_view_minus1+1, sets a variable PrevPOC equal to zero, sets a variable RecvPic equal to zero, and passes control to a decision block 320. The decision block 320 determines whether or not the end of the video sequence has been reached. If so, then control is passed to an end block 399. Otherwise, control is passed to a function block 325.

The function block 325 reads the picture order count (POC) of the next pictures, increments the variable RecvPic, and passes control to a decision block 330. The decision block 330 determines whether or not the variable CurrPOC is equal to the variable PrevPOC. If so, the control is passed to a function block 335. Otherwise, control is passed to a function block 340.

The function block 335 buffers the current picture, and returns control to the function block 325.

The function block 340 buffers the current picture, sets the variable PrevPOC equal to the variable CurrPOC, and passes control to the decision block 345. The decision block 345 determines whether or not the variable RecvPic is equal to the variable NumViews. If so, then control is passed to a decision block 355. Otherwise, control is passed to a function block 350.

The decision block 355 determines whether or not the variable RecvPic is equal to zero. If so, then control is passed to a function block 360. Otherwise, control is passed to a function block 370.

The function block 360 parses the next picture, and passes control to a function block 365. The function block 365 decodes the current picture, and returns control to the decision block 355.

The function block 350 checks and stores the missing view_ids, and passes control to the decision block 355.

The function block 370 conceals the pictures corresponding to the missing view_ids, and returns control to the decision block 320.

Figure 4:
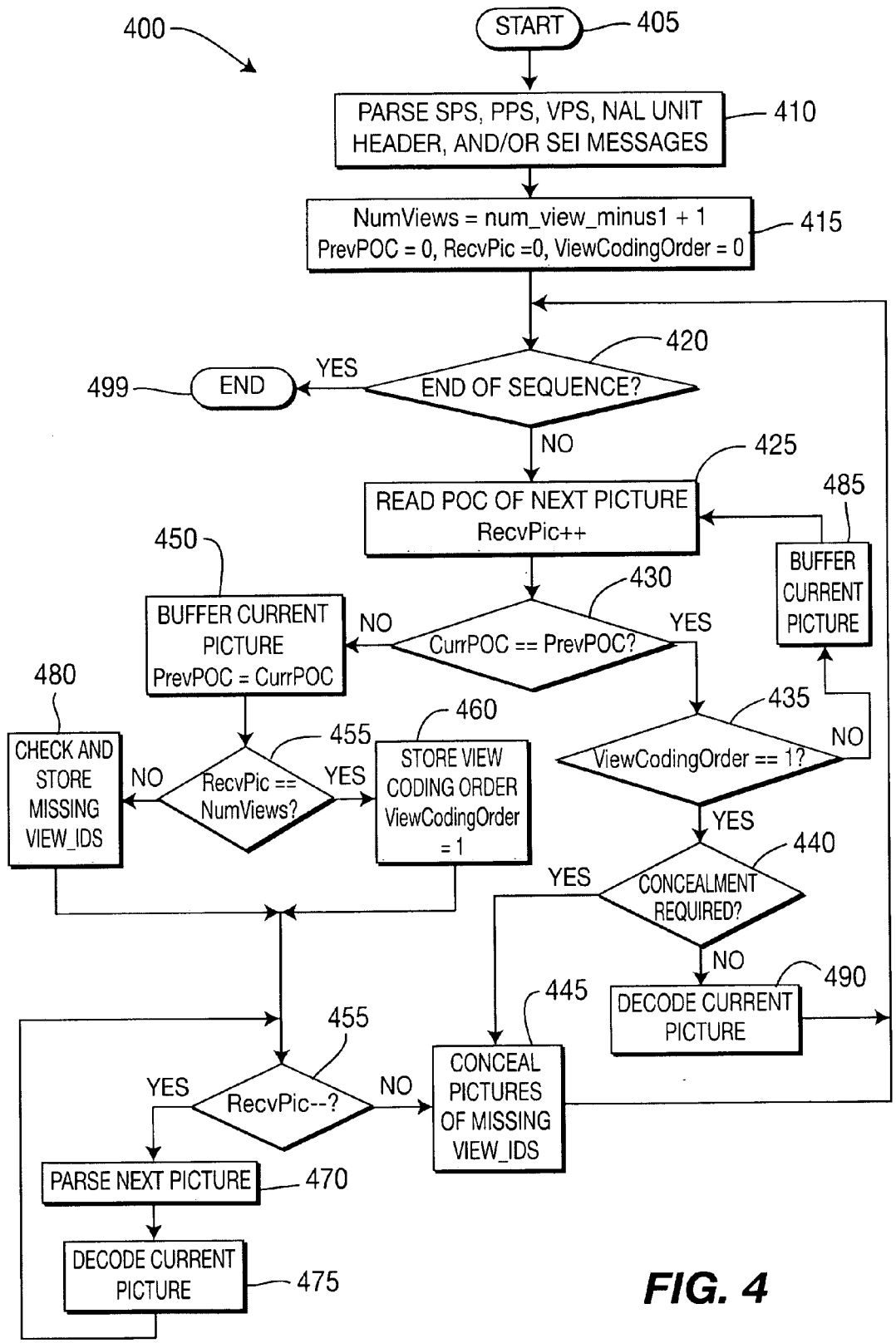
FIG. 4 is a flow diagram for another exemplary method for decoding video data corresponding to a video sequence using error concealment for lost pictures, in accordance with an embodiment of the present principles.

Turning to FIG. 4, another exemplary method for decoding video data corresponding to a video sequence using error concealment for lost pictures is indicated generally by the reference numeral 400.

The method 400 includes a start block 405 that passes control to a function block 410. The function block 410 parses the sequence parameter set (SPS), the picture parameter set (PPS), the view parameter set (VPS), the network abstraction layer (NAL) unit header, and/or any supplemental enhancement information (SEI) messages, and passes control to a function block 415. The function block 415 sets a variable NumViews equal to num_view_minus1+1, sets a variable PrevPOC equal to zero, sets a variable RecvPic equal to zero, sets a variable ViewCodingOrder equal to zero, and passes control to a decision block 420. The decision block 420 determines whether or not the end of the video sequence has been reached. If so, then control is passed to an end block 499. Otherwise, control is passed to a function block 425.

The function block 425 reads the picture order count (POC) of the next pictures, increments the variable RecvPic, and passes control to a decision block 430. The decision block 430 determines whether or not the variable CurrPOC is equal to the variable PrevPOC. If so, the control is passed to a decision block 435. Otherwise, control is passed to a function block 450.

The decision block 435 determines whether or not the variable ViewCodingOrder is equal to one. If so, then control is passed to a decision block 440. Otherwise, control is passed to a function block 485.

The decision block 440 determines whether or not concealment is required. If so, then control is passed to a function block 445. Otherwise, control is passed to a function block 490.

The function block 445 conceals the pictures of the missing view_ids, and returns control to a decision block 420.

The function block 450 buffers the current picture, sets the variable PrevPoc equal to the variable CurrPOC, and passes control to the decision block 455. The decision block 455 determines whether the variable RecvPic is equal to the variable NumViews. If so, then control is passed to a function block 460. Otherwise, control is passed to a function block 480.

The function block 460 stores the view coding order, sets ViewCodingOrder equal to one, and passes control to a decision block 465. The decision block 465 determines whether or not RecvPic is equal to zero. If so, then control is passed to a function block 470. Otherwise, control is passed to a function block 445.

The function block 470 parses the next picture, and passes control to a function block 475. The function block 475 decodes the current picture, and returns control to the decision block 465.

The function block 485 buffers the current picture, and returns control to a function block 425.

The function block 480 checks and stores missing view_ids, and passes control to the decision block 465.

The function block 490 decodes the current picture, and returns control to the decision block 420.

A description will now be given of some of the many attendant advantages/features of the present invention, some of which have been mentioned above. For example, one advantage/feature is an apparatus that includes a decoder for decoding pictures for at least one view corresponding to multi-view video content from a bitstream. The pictures are representative of at least a portion of a video sequence. At least some of the pictures correspond to different time instances in the video sequence. The decoder determines whether any of the pictures corresponding to a particular one of the different time instances are lost using an existing syntax element. The existing syntax element is for indicating a number of coded views in the bitstream, including the at least one view.

Another advantage/feature is the apparatus having the decoder as described above, wherein the existing syntax element is a multi-view video coding syntax element.

Yet another advantage/feature is the apparatus having the decoder wherein the existing syntax element is a multi-view video coding syntax element as described above, wherein the multi-view video coding syntax element corresponds to an extension of the International Organization for Standardization/International Electrotechnical Commission Moving Picture Experts Group-4 Part 10 Advanced Video Coding standard/International Telecommunication Union, Telecommunication Sector H.264 recommendation.

Still another advantage/feature is the apparatus having the decoder as described above, wherein the existing syntax element is present at a high level.

Moreover, another advantage/feature is the apparatus having the decoder as described above, wherein the high level corresponds to at least at one of a slice header level, a sequence parameter set level, a picture parameter set level, a view parameter set level, a network abstraction layer unit header level, and a level corresponding to a supplemental enhancement information message.

Further, another advantage/feature is the apparatus having the decoder as described above, wherein any of the pictures corresponding to the particular one of the different time instances are buffered, and the decoder maintains a count for the pictures that arrive at the particular one of the different time instances.

Also, another advantage/feature is the apparatus having the decoder wherein any of the pictures corresponding to the particular one of the different time instances are buffered, and the decoder maintains a count for the pictures that arrive at the particular one of the different time instances as described above, wherein the decoder compares a value of the count to a value of the existing syntax element.

Additionally, another advantage/feature is the apparatus having the decoder that compares a value of the count to a value of the existing syntax element as described above, wherein a particular one of the pictures is designated as lost, when the value of the count for the particular picture does not equal the value of the existing syntax element.

Moreover, another advantage/feature is the apparatus having the decoder wherein a particular one of the pictures is designated as lost, when the value of the count for the particular picture does not equal the value of the existing syntax element as described above, wherein the decoder determines a view identifier of the particular one of the pictures designated as lost by looking for a missing view identifier from among a set of view identifiers that have arrived corresponding to the bitstream.

Further, another advantage/feature is the apparatus having the decoder as described above, wherein to decode the pictures from the bitstream, the decoder buffers the pictures only once.

Also, another advantage/feature is the apparatus having the decoder that buffers the pictures only once to decode the pictures from the bitstream as described above, wherein the decoder buffers the pictures only once, at the beginning of the bitstream.

Additionally, another advantage/feature is the apparatus having the decoder that buffers the pictures only once to decode the pictures from the bitstream as described above, wherein the decoder buffers the pictures only once, subsequent to a change of coding order.

Moreover, another advantage/feature is the apparatus having the decoder that buffers the pictures only once to decode the pictures from the bitstream as described above, wherein the decoder maintains an order of view identifiers for the pictures, subsequent to the buffering.

Further, another advantage/feature is the apparatus having the decoder that maintains an order of view identifiers for the pictures, subsequent to the buffering, as described above, wherein the decoder uses the order that is maintained for subsequent ones of the different time instances to determine if any of the pictures corresponding to the subsequent ones of the different time instances are lost, the subsequent ones of the different time instances being subsequent with respect to the particular one of the different time instances.

Also, another advantage/feature is the apparatus having the decoder as described above, wherein the at least one view comprises at least two views, and the decoder uses a number of views between the two views to determine if any of the pictures are lost, when a first coded view from among the at least one view, and the two views, are compatible views with respect to the International Organization for Standardization/International Electrotechnical Commission Moving Picture Experts Group-4 Part 10 Advanced Video Coding standard/international Telecommunication Union, Telecommunication Sector H.264 recommendation, the first coded view being one of one of the two views or another view.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a decoder for decoding pictures for at least one view corresponding to multi-view video content from a bitstream, the pictures representative of at least a portion of a video sequence, at least some of the pictures corresponding to different time instances in the video sequence, wherein said decoder determines whether any of the pictures corresponding to a particular one of the different time instances are lost using an existing syntax element, the existing syntax element for indicating a number of coded views in the bitstream, including the at least one view.

2. The apparatus of claim 1, wherein the existing syntax element is a multi-view video coding syntax element.

3. The apparatus of claim 2, wherein the multi-view video coding syntax element corresponds to an extension of the International Organization for Standardization/International Electrotechnical Commission Moving Picture Experts Group-4 Part 10 Advanced Video Coding standard/International Telecommunication Union, Telecommunication Sector H.264 recommendation.

4. The apparatus of claim 1, wherein the existing syntax element is present at a high level.

5. The apparatus of claim 1, wherein the high level corresponds to at least at one of a slice header level, a sequence parameter set level, a picture parameter set level, a view parameter set level, a network abstraction layer unit header level, and a level corresponding to a supplemental enhancement information message.

6. The apparatus of claim 1, wherein any of the pictures corresponding to the particular one of the different time instances are buffered, and said decoder maintains a count for the pictures that arrive at the particular one of the different time instances.

7. The apparatus of claim 6, wherein said decoder compares a value of the count to a value of the existing syntax element.

8. The apparatus of claim 7, wherein a particular one of the pictures is designated as lost, when the value of the count for the particular picture does not equal the value of the existing syntax element.

9. The apparatus of claim 8, wherein said decoder determines a view identifier of the particular one of the pictures designated as lost by looking for a missing view identifier from among a set of view identifiers that have arrived corresponding to the bitstream.

10. The apparatus of claim 1, wherein to decode the pictures from the bitstream, said decoder buffers the pictures only once.

11. The apparatus of claim 10, wherein said decoder buffers the pictures only once, at the beginning of the bitstream.

12. The apparatus of claim 10, wherein said decoder buffers the pictures only once, subsequent to a change of coding order.

13. The apparatus of claim 10, wherein said decoder maintains an order of view identifiers for the pictures, subsequent to the buffering.

14. The apparatus of claim 13, wherein said decoder uses the order that is maintained for subsequent ones of the different time instances to determine if any of the pictures corresponding to the subsequent ones of the different time instances are lost, the subsequent ones of the different time instances being subsequent with respect to the particular one of the different time instances.

15. The apparatus of claim 1, wherein the at least one view comprises at least two views, and said decoder uses a number of views between the two views to determine if any of the pictures are lost, when a first coded view from among the at least one view, and the two views, are compatible views with respect to the International Organization for Standardization/International Electrotechnical Commission Moving Picture Experts Group-4 Part 10 Advanced Video Coding standard/International Telecommunication Union, Telecommunication Sector H.264 recommendation, the first coded view being one of one of the two views or another view.

16. A method, comprising:
decoding pictures for at least one view corresponding to multi-view video content from a bitstream, the pictures representative of at least a portion of a video sequence, at least some of the pictures corresponding to different time instances in the video sequence, wherein said decoding step comprises determining whether any of the pictures corresponding to a particular one of the different time instances are lost using an existing syntax element, the existing syntax element for indicating a number of coded views in the bitstream, including the at least one view.

17. The method of claim 16, wherein the existing syntax element is a multi-view video coding syntax element.

18. The method of claim 17, wherein the multi-view video coding syntax element corresponds to an extension of the International Organization for Standardization/International Electrotechnical Commission Moving Picture Experts Group-4 Part 10 Advanced Video Coding standard/International Telecommunication Union, Telecommunication Sector H.264 recommendation.

19. The method of claim 16, wherein the existing syntax element is present at a high level.

20. The method of claim 16, wherein the high level corresponds to at least at one of a slice header level, a sequence parameter set level, a picture parameter set level, a view parameter set level, a network abstraction layer unit header level, and a level corresponding to a supplemental enhancement information message.

21. The method of claim 16, wherein any of the pictures corresponding to the particular one of the different time instances are buffered, and said decoding step comprises maintaining a count for the pictures that arrive at the particular one of the different time instances.

22. The method of claim 21, wherein said decoding step comprises comparing a value of the count to a value of the existing syntax element.

23. The method of claim 22, wherein a particular one of the pictures is designated as lost, when the value of the count for the particular picture does not equal the value of the existing syntax element.

24. The method of claim 23, wherein said decoding step comprises determining a view identifier of the particular one of the pictures designated as lost by looking for a missing view identifier from among a set of view identifiers that have arrived corresponding to the bitstream.

25. The method of claim 16, wherein to decode the pictures from the bitstream, said decoding step comprises buffering the pictures only once.

26. The method of claim 25, wherein said decoder buffers the pictures only once, at the beginning of the bitstream.

27. The method of claim 25, wherein said decoder buffers the pictures only once, subsequent to a change of coding order.

28. The method of claim 25, wherein said decoding step comprises maintaining an order of view identifiers for the pictures, subsequent to the buffering.

29. The method of claim 28, wherein said decoding step comprising using the order that is maintained for subsequent ones of the different time instances to determine if any of the pictures corresponding to the subsequent ones of the different time instances are lost, the subsequent ones of the different time instances being subsequent with respect to the particular one of the different time instances.

30. The method of claim 16, wherein the at least one view comprises at least two views, and said decoding step uses a number of views between the two views to determine if any of the pictures are lost, when a first coded view from among the at least one view, and the two views, are compatible views with respect to the International Organization for Standardization/International Electrotechnical Commission Moving Picture Experts Group-4 Part 10 Advanced Video Coding standard/International Telecommunication Union, Telecommunication Sector H.264 recommendation, the first coded view being one of one of the two views or another view.

* * * * *